United States Patent

[11] 3,576,945

[72] Inventor William C. Ebeling
Binghamton, N.Y.
[21] Appl. No. 809,732
[22] Filed Mar. 24, 1969
[45] Patented May 4, 1971
[73] Assignee Singer-General Precision, Inc.
Binghamton, N.Y.

[54] APPARATUS FOR OPTICALLY INSETTING ONE IMAGE INTO ANOTHER IMAGE
7 Claims, 1 Drawing Fig.

[52] U.S. Cl. .......... 178/6.8, 178/7.85, 178/Dig. 6
[51] Int. Cl. .......... H04n 1/38, H04n 5/24
[50] Field of Search .......... 178/6 (F&M), 7.2, 7.85, 7.86, 7.88, 7.92, 6.8, 6 (PC)

[56] References Cited

UNITED STATES PATENTS 2,730,565 1/1956 Owens .......... 178/6F&M
3,225,138 12/1965 Montani .......... 178/7.85
3,459,888 8/1969 Sokolov .......... 178/6F&M

*Primary Examiner*—Robert L. Richardson
*Assistant Examiner*—George G. Stellar
*Attorneys*—Francis L. Masselle, William Grobman and Charles S. McGuire

ABSTRACT: Apparatus is provided for insetting one image optically into a portion of another image. The apparatus includes two separate image generation and projection systems. A beam splitter combines the two images for projection onto a single viewing screen. One image projection system includes a field lens having one surface comprising an electroplastic film. A cathode ray is caused to sweep those portions of the film which represent the portion to be insetted by the other image. A TV camera system controls the generation of the cathode beam in response to an image projected through the beam splitter onto the TV camera. The portions of the film struck by the beam effectively occult corresponding portions of one image. The other image occupies the occulted portion.

PATENTED MAY 4 1971 3,576,945
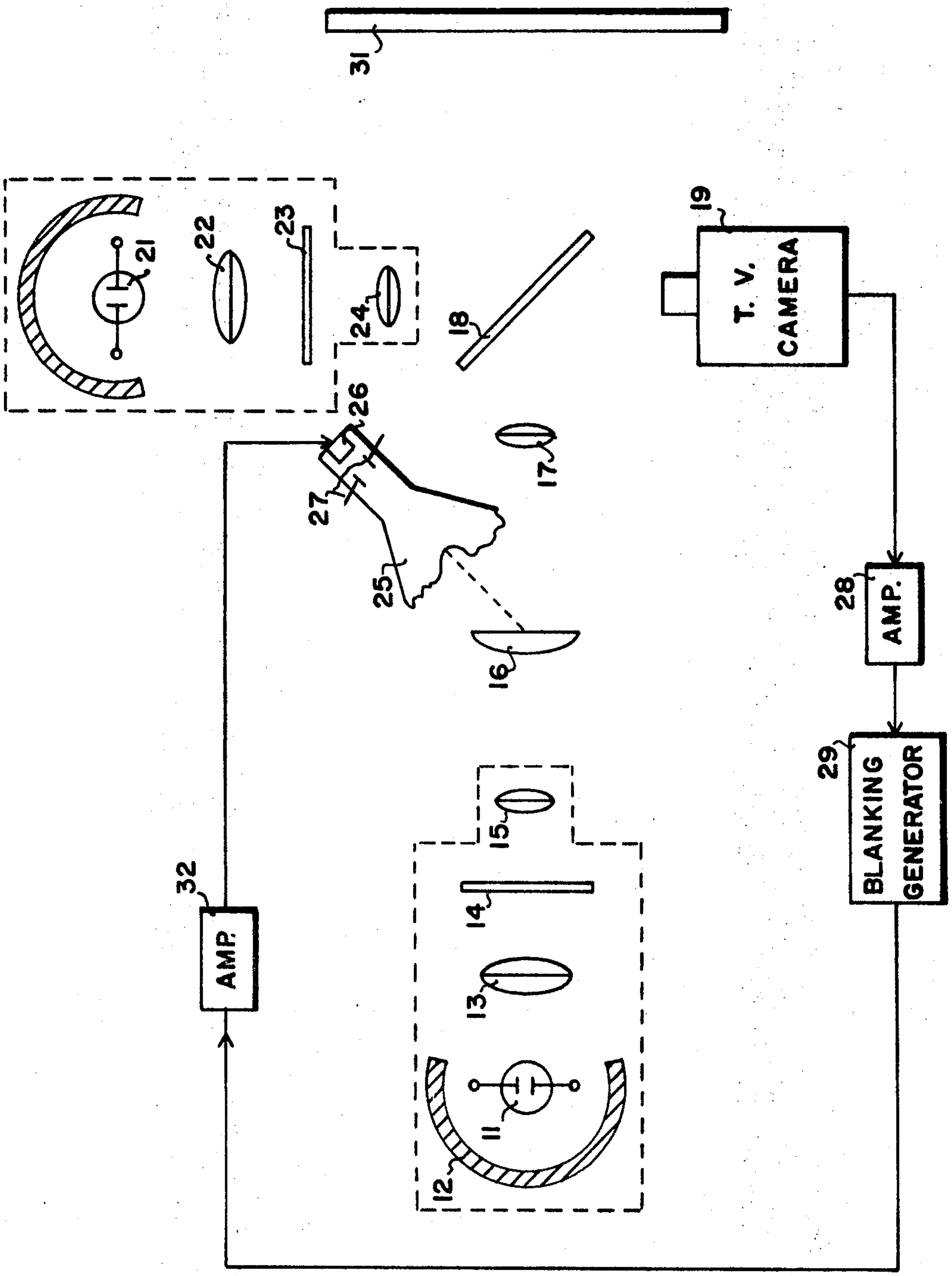
INVENTOR.
WILLIAM C. EBELING
BY
William Grolman

APPARATUS FOR OPTICALLY INSETTING ONE IMAGE INTO ANOTHER IMAGE

This invention relates to optical systems and, more particularly, to systems for insetting one image into another.

Insetting is not new. It has been performed in the past in motion pictures, in television broadcasting and in many other optical systems. Insetting comprises the combining of two images, one into a portion of the other. There have been some problems in the past with insetting. One problem has been the clean butting of the edges of the two images so that there does not appear to be a line of demarcation but one image appears to blend into another to form a single image. Another has been bleedthrough where one image is superimposed on the other. One method for avoiding bleedthrough is by the obliteration of that portion of the base image where the superimposed image is to be placed. Many methods for obliterating a part of the base image have been suggested in the past, but most of the prior art methods suffer from one or more disadvantages.

It is an object of this invention to provide a new and improved insetting system.

It is another object of this invention to provide a new and improved system for insetting one optical image into another.

It is a further object of this invention to provide a new and improved system for insetting one optical image into another whereby portions of the base image are obliterated to accommodate the superimposed image.

It is still another object of this invention to provide a new and improved insetting system which utilizes a Schlieren optical element and electronic beam for controlling that element to readily obliterate those portions of the base image which are to be occupied by the superimposed image.

Other objects and advantages of this invention will become apparent as the following description proceeds, which description should be considered together with the accompanying drawing in which the single FIGURE is a schematic showing of one embodiment of the invention.

Referring now to the drawing in detail, the reference character 11 designates a source of light such as an arc or projection lamp. Backing up the source 11 is a reflector 12, preferably a spherical or parabolic reflector. Light from the source 11 passes through a condensing lens 13 and a film transparency 14 and is projected by a lens 15 onto a flat surface of a field lens 16. The image on the field lens 16 is projected by a lens 17 through a half-silvered mirror or other beam splitter 18 onto a screen 31. A second light source 21, also backed up by a suitable reflector, passes its light through a condensing lens 22 and a second film transparency 23. The image of the film transparency 23 is focused by means of a projection lens 24 onto the surface of the beam splitter 18, which reflects it onto the screen 31. A TV camera 19 is positioned to receive light from the beam splitter 18. The output of the TV camera 19 feeds a video amplifier 28 and a blanking generator 29. The output from the blanking generator 29 is applied to the input of the video amplifier 32 whose output is applied to a cathode ray generator 26. Deflecting plates 27 of the cathode ray generator 26 apply potentials to the beam generated by the cathode gun 26 so that the beam scans the flat surface of the field lens 16.

In operation, the two sources of light 11 and 21 are both energized and the generated light is projected through the respective condensing lenses 13 and 22 to project the images which are present on the film transparencies 14 and 23 through the projection lenses 15 and 24. The image of the film transparency 23 is split into two portions by the beam splitter 18. A portion of that image is reflected onto the screen 13 and another portion passes through the beam splitter 18 and is applied to the television camera 19. The camera 19 generates video signals which are proportional to the light forming the image from the film transparency 23. These video images are amplified by the amplifier 28 and are applied to a blanking generator 29. The blanking generator 29 converts a black signal, as generated by the camera 19, into a blanking signal. Thus, when these signals from the blanking generator 29 are amplified by the video amplifier 32 and are applied to the cathode gun 26, they control the generation of the cathode beam. The cathode beam which is generated by the gun 26 is caused to scan a television raster, or other regular pattern, over the face of the field lens 16 in synchronism with the similar scanning by of the camera 19 of the image applied to it. Thus, whenever the camera 19 scans a light portion of its image, the beam generated by the gun 26 is generated. Whenever the camera 19 scans a darkened portion of the image projected onto it, the signals applied to the gun 26 turn the gun off, and no cathode beam is generated. Thus, whenever the camera 19 scans a light portion of the image which is projected upon it, a cathode beam generated by the gun 26 strikes the flat portion of the field lens 16 at a corresponding point, and when the portion scanned by the camera 19 is dark, the beam normally generated by the gun 26 is cut off and no beam strikes that corresponding portion of the field lens 16. Since that flat surface of the field lens 16 is covered with an electroplastic material or a similar Schlieren optical system such as those described in "Display Systems Engineering," edited by H.R. Luxemberg and Rudolph L. Kuehn, and published by McGraw-Hill Book Co., in 1968, pp. 323—332, its transmission characteristics are modified at any points where the electron beam strikes it. Normally the image of the film transparency 14 is focused onto the flat surface of the field lens 16 and is projected by the projection lens 17 onto the screen 31. However, modification of the transmission characteristics of the Schlieren film on the field lens 16 prevents the transmission of light from those portions of the image on the field lens 16 to the screen 31. Light passing through the field lens 16 at the points where the Schlieren system is modified is additionally refracted so that it passes off in another direction and does not reach the screen 31, or it may be blocked or partially blocked by the Schlieren system. In any case, the final result is the blanking of those portions of the image from the film transparency 14 which correspond to the image from the film transparency 23 so that the two images are accurately combined on the screen 31.

One of the primary advantages of the system shown in the system of this invention is that the entire system cooperates to produce a single result. The actual image which is to be inset generates the signals which obliterates that portion of the base image. Since the alignment of the two images is built into the system, the composite image which appears on the screen 31 is a perfect match of the base and inset images. Once the operating system has been set up, changes in the film transparencies 14 and 23 will not affect the accuracy or the operation of the overall system. The system automatically operates to produce the correct results.

As mentioned above, the occulting system which includes the film on the field lens 16 and the cathode beam generator 25 may comprise any Schlieren-type system such as those described in "Display Systems Engineering" identified above. In addition, where a flying spot scanner is substituted for the cathode beam generator 25, the film on the flat surface of the lens 16 can comprise photochromic glass such as that described in "Photochromic Glass—A New Tool for the Display System Designer," by Benjamin Justice and F.B. Leibold, Jr., published in Information Display for Nov.—Dec. 1965, pp. 23—28. In some cases dichroic mirrors may be desired for the beam splitter 18. Such beam splitters are discussed in "Applied Optics and Optical Engineering," published by Academic Press, New York, in 1965, pp. 299 and 300. In some cases it may be desirable to add a screen or a field lens before the camera 19, but since these matters are design features, they are not described in detail.

The above specification has described in some detail the construction and operation of an optical system for producing a composite image formed of one image inset into another. The system described above is an automatically operating system which can utilize images generated by any of many means. It is realized that this description may indicate to others skilled in the art additional ways in which the principles of this invention may be utilized without departing from its spirit. It is therefore intended that this invention be limited only by the scope of the appended claims.

I claim:

1. An optical insetting system wherein one optical image is inset into another optical image, said system comprising a first image generator and a second image generator, a projection screen, means for projecting a first image along a first image projection path from said first generator onto said screen, means for projecting a second image along a second image projection path onto said screen, an electro-optical element in said first projection path so arranged that said first image passes therethrough, a television camera, means for transmitting a portion of the light comprising said second image to said television camera, means for generating an electron beam, means for causing said electron beam to scan said electro-optical element in synchronism with the scanning of said second image by said television camera, and means connecting the output from said television camera to said beam generating means to control the generation of said beam so that said electro-optical element occults that portion of said first image which corresponds to the second image so that said second image is inset into said first image.

2. An optical insetting system wherein an optical image is inset into another optical image, said system comprising a first image generator and a second image generator, a screen upon which both images are projected, means for projecting the images generated by said first and second image generators onto said screen, a selectively controlled light valve interposed between said first image generator and said screen, first means for receiving a projection of the image generated by said second image generator, and second means under the control of said first means for causing said light valve selectively to occult the portion of said first image which corresponds to the position said second image occupies on said screen.

3. The system defined in claim 2 wherein said second means comprises an electron gun for generating a beam of electrons and means for deflecting said generated beam to traverse said electro-optical element.

4. The system defined in claim 3 wherein said electro-optical element comprises a material whose optical transmission characteristics are temporarily modified by the local application of electricity thereto, the characteristics of said material being modified only at the points where said electricity is applied.

5. The system defined in claim 4 wherein said first means comprises a photosensitive device which generates electrical signals proportional to the point-by-point intensity of light projected upon it, and means for scanning said device to recover the electrical signals on a point-by-point basis.

6. The system defined in claim 5 wherein said means for deflecting said generated beam and said means for scanning said device are synchronized so that said device and said element are scanned together, and further including means for connecting the electrical signal output from said device to said electron gun so that said beam of electrons is generated in accordance with the signals generated by said device.

7. The system defined in claim 6 further including a beam splitter arranged to transmit some of the image generated by said second image generator to said electro-optical device and to transmit some of the image generated by said second image generator to said screen.